US010536513B2

(12) United States Patent
Newman et al.

(10) Patent No.: US 10,536,513 B2
(45) Date of Patent: *Jan. 14, 2020

(54) OPENING LOCAL APPLICATIONS FROM BROWSERS

(71) Applicant: Google LLC, Mountain View, CA (US)

(72) Inventors: Jessie Lynne Newman, New York, NY (US); Frank Pape, III, Cortlandt Manor, NY (US); Ali Akhavan Bitaghsir, New York, NY (US); Brian Schneider, Brooklyn, NY (US); James Michael McCollum, Brooklyn, NY (US); Eric Huayu Zhang, Jersey City, NJ (US); Rachel Werner Barton, Golden, CO (US); Marc Miller, New York, NY (US); Rishi Sharma, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,353

(22) Filed: Jan. 22, 2018

(65) Prior Publication Data
US 2018/0146029 A1 May 24, 2018

Related U.S. Application Data

(63) Continuation of application No. 14/547,086, filed on Nov. 18, 2014, now Pat. No. 9,876,849.
(Continued)

(51) Int. Cl.
G06F 15/16 (2006.01)
H04L 29/08 (2006.01)
(Continued)

(52) U.S. Cl.
CPC ............ *H04L 67/10* (2013.01); *G06F 16/176* (2019.01); *G06F 16/178* (2019.01);
(Continued)

(58) Field of Classification Search
CPC ......... G06F 17/30165; G06F 17/30174; G06F 17/30194
See application file for complete search history.

(56) References Cited

U.S. PATENT DOCUMENTS 5,892,905 A * 4/1999 Brandt .................... H04L 63/02
726/11
5,991,760 A 11/1999 Gauvin et al.
(Continued)

OTHER PUBLICATIONS

International Search Report and Written Opinion dated Feb. 16, 2016 for International Application No. PCT/US2015/058793, International Filing Date, Nov. 3, 2015, 12 pages.
(Continued)

*Primary Examiner* — Dhairya A Patel
(74) *Attorney, Agent, or Firm* — Lowenstein Sandler LLP

(57) ABSTRACT

Systems and methods are disclosed herein for opening files via local applications. A first application on a local device receives a request to open a document specified by a user via a user interface associated with the first application, the document having a document identifier and associated with a first file stored on a server, the request comprising the document identifier and a user identifier. The first application forwards the request to open the document associated with the first file to a second application on the local device, and receives, from the second application, a list comprising one or more document processing applications that are on the local device and are capable of opening a second file that is stored on the local device and has the same document identifier as the document specified by the user, the second file being a local copy of the first file. The first application
(Continued)

selects one of the document processing applications from the list, and causes a selected processing application to open the second file.

20 Claims, 8 Drawing Sheets

Related U.S. Application Data

(60) Provisional application No. 62/075,825, filed on Nov. 5, 2014.

(51) Int. Cl.
  *H04L 29/06* (2006.01)
  *G06F 16/176* (2019.01)
  *G06F 16/178* (2019.01)
  *G06F 16/182* (2019.01)
  *G06F 21/00* (2013.01)

(52) U.S. Cl.
  CPC ............ *G06F 16/182* (2019.01); *G06F 21/00* (2013.01); *H04L 67/06* (2013.01); *H04L 67/42* (2013.01)

(56) References Cited

U.S. PATENT DOCUMENTS

| | | | |
|---|---|---|---|
| 6,105,028 A | 8/2000 | Sullivan et al. | |
| 6,523,166 B1 | 2/2003 | Mishra et al. | |
| 6,947,556 B1 | 9/2005 | Matyas, Jr. et al. | |
| 7,251,827 B1* | 7/2007 | Guo | G06F 21/31 726/10 |
| 7,536,713 B1* | 5/2009 | Bartholomew | G06F 16/40 726/7 |
| 8,127,033 B1 | 2/2012 | Newstadt et al. | |
| 8,452,853 B2 | 5/2013 | Batra et al. | |
| 9,317,709 B2* | 4/2016 | Procopio | G06F 21/6218 |
| 9,876,849 B2* | 1/2018 | Newman | G06F 16/176 |
| 2007/0198657 A1 | 8/2007 | Saliba et al. | |
| 2008/0028391 A1 | 1/2008 | Nallipogu et al. | |
| 2008/0028416 A1 | 1/2008 | Gill et al. | |
| 2008/0133618 A1* | 6/2008 | Kawabe | G06F 16/93 |
| 2009/0265607 A1 | 10/2009 | Raz et al. | |
| 2009/0282345 A1* | 11/2009 | Smith | G06F 17/243 715/744 |
| 2010/0281102 A1 | 11/2010 | Chinta et al. | |
| 2010/0299187 A1 | 11/2010 | Duggal | |
| 2011/0066668 A1* | 3/2011 | Guarraci | G06F 16/27 707/831 |
| 2011/0138059 A1 | 6/2011 | Schleifer et al. | |
| 2012/0246291 A1 | 9/2012 | Wong et al. | |
| 2013/0132463 A1 | 5/2013 | Garcia-Ascanio et al. | |
| 2013/0226876 A1* | 8/2013 | Gati | G06F 16/178 707/652 |
| 2013/0254314 A1* | 9/2013 | Chow | H04L 67/06 709/206 |
| 2013/0276112 A1 | 10/2013 | Dalcher | |
| 2013/0339474 A1* | 12/2013 | Picker | H04N 21/43615 709/217 |
| 2013/0346450 A1* | 12/2013 | Procopio | G06F 21/6218 707/783 |
| 2014/0101310 A1 | 4/2014 | Savage et al. | |
| 2014/0115406 A1* | 4/2014 | Agrawal | H04L 67/06 714/47.1 |
| 2014/0173700 A1 | 6/2014 | Awan et al. | |
| 2014/0282480 A1 | 9/2014 | Matthew et al. | |
| 2014/0379902 A1 | 12/2014 | Wan et al. | |
| 2015/0169419 A1* | 6/2015 | Carney | H04L 69/00 714/4.11 |
| 2016/0019278 A1* | 1/2016 | Jadhav | H04L 67/1095 707/624 |
| 2016/0357737 A1* | 12/2016 | Oklota | G06F 16/438 |
| 2016/0378864 A1* | 12/2016 | Mullins | G06F 16/951 707/770 |

OTHER PUBLICATIONS

Office Action dated Jul. 5, 2016 in U.S. Appl. No. 14/306,527 (26 pages).
International Search Report and Written Opinion dated Aug. 26, 2015 to International Application No. PCT/US2015/036073, International Filing Date Jun. 16, 2015, 11 pgs.
Apache Open Office Forum, https://forum.openoffice.org/en/forum/viewtopic.php?t=38583, retrieved from internet Aug. 28, 2014, 13 pages.
Anonymous: "Active Directory—Wikipedia", Jun. 7, 2014 (Jun. 7, 2014), XP055454084, Retrieved from the Internet: URL:https:Hen.wikipedia.org/w/index.php?title=Active_Directory&oldid=61 1 991 903 [retrieved on Feb. 26, 2018].
Anonymous: "Challenge-response authentication—Wikipedia, the free encyclopedia", Jun. 14, 2014 (Jun. 14, 2014), pp. 1-4, XP055263020, Retrieved from the Internet: URL:https://en.wikipedia.org/w/index.php?title=Challenge%E2%80%93response_authentication&oldid=612907158 [retrieved on Apr. 5, 2016].

* cited by examiner

OPENING LOCAL APPLICATIONS FROM BROWSERS

CROSS REFERENCE TO RELATED APPLICATIONS

This application is a continuation of pending U.S. patent application Ser. No. 14/547,086 filed Nov. 18, 2014, entitled "Opening Local Applications from Browsers," which claims priority to U.S. Provisional Application Ser. No. 62/075,825 filed Nov. 5, 2014, entitled "Opening Local Applications from Browsers," the entire contents of which are hereby incorporated by reference.

FIELD OF THE INVENTION

In general, this disclosure relates to using a browser to open a local file with a local application.

BACKGROUND

Cloud-based document storage systems offer many advantages to users, including access of files from multiple devices, collaboration among multiple users, and automatic synchronization of files between a local device and a server. Typically files in the cloud are accessed using one of two methods. In one method, files are stored on the local device's file system and synchronized with a server. In this case, the files are accessed locally using the local device's operating system and locally installed applications. However, the only access restrictions are those associated with the operating system. Furthermore, the files can only be accessed using the local device.

In another method, a browser is used to access files in the cloud. The browser-based method is advantageously flexible in that files can be accessed from any device with browser capabilities. However, browser-based editing applications lack certain capabilities compared to locally installed applications. Furthermore, browser-based applications depend on network connectivity and high bandwidth to effectively function. In an example, a file is accessed over a browser and is manually downloaded to a local device. The user must then and manually navigate through the local device's file system to open the file using a locally installed application. This process is not only cumbersome to the user, but also does not even result in the edited file being synchronized with the server.

SUMMARY

Accordingly, systems and methods are described herein for facilitating communication between a browser, a sync client, and a local application. In certain aspects, the systems and methods described herein relate to using a browser to open local files with local applications. A request is received from a first application on a local device to open a document having a document identifier and associated with a first file stored on a server. The request may comprise the document identifier and a user identifier. A second file that is stored on the local device may be determined to be associated with the document identifier, and a user associated with the user identifier may be determined to be authorized to access the second file. A list may be transmitted, based on the determining, to the first application, the list comprising one or more applications that are on the local device and are capable of opening the second file. An indication may be received from the first application of a second application selected from the list. A message may be transmitted to open the second file with the second application.

A sync client may perform one or more of the receiving, determining, and transmitting steps described above. The sync client may communicate with an intermediary proxy that transmits the request to the sync client, receives the list from the sync client, and transmits the indication to the sync client. The intermediary proxy may modify at least one of the request, the list, and the indication based on formatting requirements for the sync client and for the first application.

A contents file may store a list of local application identifiers corresponding to a plurality of local applications that are installed on the local device and registered with the sync client. The message to open the second file may comprise an application identifier associated with the second application. Whether the application identifier is included in the contents file may be determined.

Determining whether the user is authorized to access the second file may comprise one or more of the following steps. A first hash may be received that is computed based on at least one pre-shared key. A second hash may be computed by the first application and based on the at least one pre-shared key. The first hash may be compared to the second hash. The user may be authorized to access the second file if the first hash matches the second hash.

The first and second hashes may be each computed based at least in part on at least one nonce. At least one of the request, the list, and the indication may include standard input or output streams of data associated with the first application. The second file may be created from a copy of the first file. The first application may be a browser or a browser extension associated with the browser. The user may provide the one or more requests via the browser. The list may transmitted to the first application only if the second file is synchronized with the first file.

A request may be received at a local device from a user to open a document having a document identifier and associated with a first file stored on a server. The request may comprise the document identifier and a user identifier associated with the user. The requested document identifier and user identifier may be transmitted to a first application on the local device. A list may be received from the first application, the list comprising one or more applications that are on the local device. An indication of a second application selected from the list may be received, from the user. A message may be transmitted, to the first application, the message comprising the file identifier and an identifier associated with the second application.

A third application may perform one or more of the receiving and transmitting described in the above paragraph. The third application may be a browser or a browser extension associated with the browser. The third application may communicate with an intermediary proxy that transmits the request to the third application, receives the list from the third application, and transmits the indication to the third application. The intermediary proxy may modify at least one of the request, the list, and the indication based on formatting requirements for the third application and for the first application.

DETAILED DESCRIPTION

To provide an overall understanding of the disclosure, certain illustrative examples will now be described, including a system and method for opening local applications from browsers. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more components, which include a processing device or devices, such as a computer, microprocessor, logic device or other device or processor that is configured with hardware, firmware, and software to carry out one or more of the computerized methods described herein.

Opening local applications from browsers is useful because local applications may provide increased or different file editing capabilities as compared to browser-based applications delivered from servers. By opening local applications from browsers, the benefits of using local applications can be realized while also realizing the benefits of storing documents in cloud services.

Figure 1:
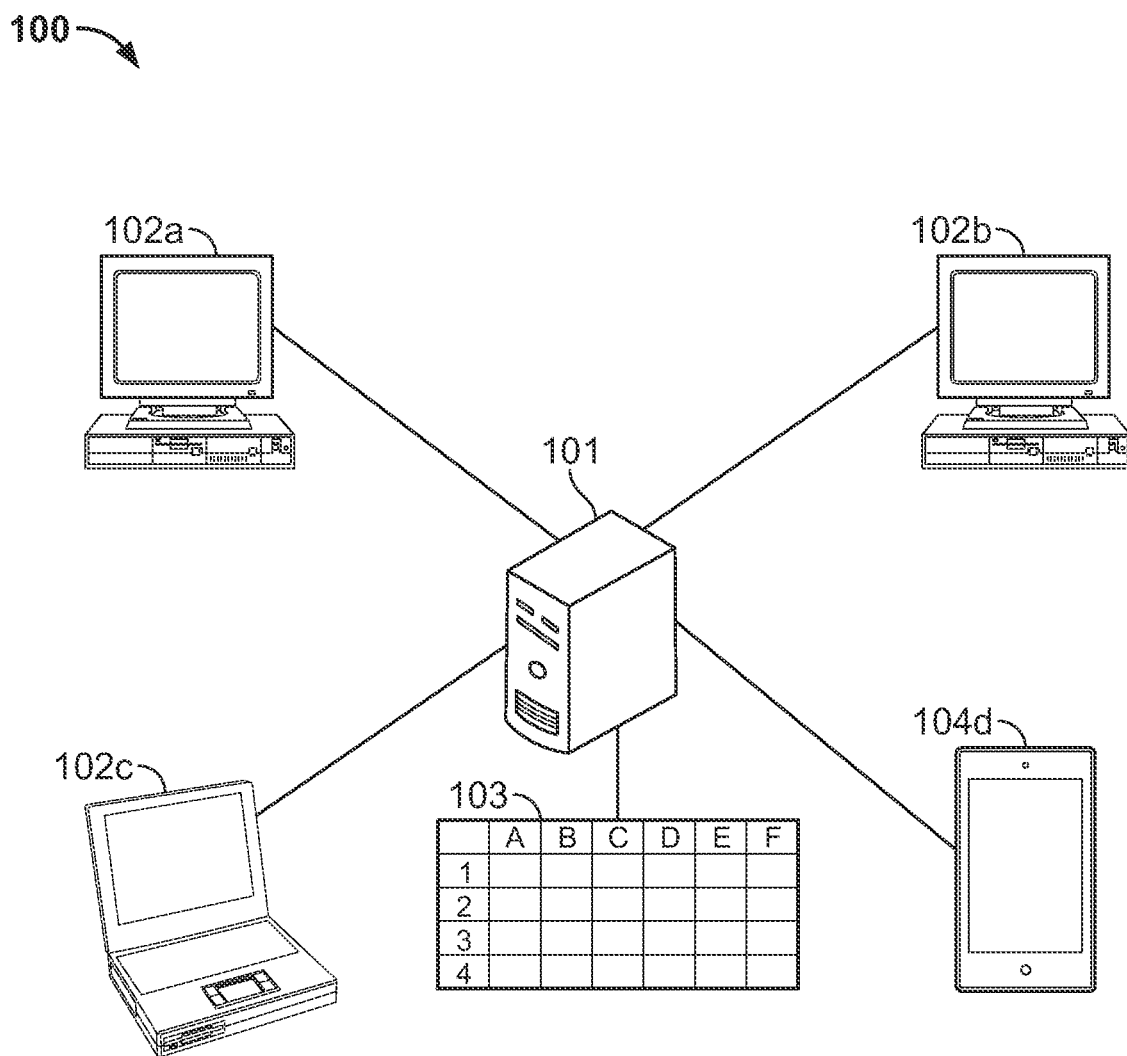
FIG. 1 is a block diagram of a cloud computing service, according to an illustrative implementation.

FIG. 1 shows a client-server system 100 that includes a cloud computing service 101 and a number of client devices 102a-102d (generally, client device 102). The cloud computing service 101 provides cloud computing services for a set of client devices 102. In particular, the cloud computing service 101 may include one or more servers that store a number of files accessible by the client devices 102a-102d, such as an exemplary collaborative spreadsheet 103. Users at the client devices 102 may create, edit, copy, share, and delete files stored on cloud computing service 101. For example, the client devices 102 may each use a web browser to simultaneously access the spreadsheet 103 on the cloud computing service 101. The cloud computing service 101 provides each client device 102 with a local copy of the spreadsheet 103, which users on the client devices 102 may then view and edit. The cloud computing service 101 may synchronize the local copies of the spreadsheet 103 with one another and with a copy of spreadsheet 103 that is stored on a server in cloud computing service 101. In one example, edits, which may be referred to herein as mutations, that are made by the client device 102a are automatically sent to the cloud computing service 101 and transmitted to the other client devices 102b, 102c, and 102d. In this manner, mutations made by one collaborator may be immediately seen by other collaborators. As used herein, a file includes a set of digitally encoded bits stored on a storage medium. A cloud file includes a file that is stored on a server and accessible via a network. A local file includes a file stored on a user's local device. A client device includes a local device that communicates with a server in a client-server relationship. As used herein, a document is part of a cloud computing service and may be associated with multiple files. For example, a cloud file may be a copy of a document stored on a server, and a local file may be a copy of the same document stored on a local device. Generally, multiple copies of the same document may be identical, but they may differ due if mutations made by one collaborator have not yet been transmitted to other collaborators. This situation may occur when the network connection is slow or intermittent. Multiple copies of the same document may also differ slightly if the copies are stored on disparate types of devices, such as devices with different operating systems. In this case, different copies may have slightly different metadata, or may be encoded differently. For example, one copy may be encoded in a big-endian format, and another copy may be encoded in a little-endian format. These format differences can exist across multiple files that are copies of the same document, as long as the substance of the information that is displayed to the user is the same across the copies.

The client devices 102 may include any combination of desktop computers, laptop computers, tablets, smart phones, mobile electronic devices, or any other device that may connect to cloud computing service 101 through a network. Only four client devices 102 are shown in system 100, but it should be understood that any number of client devices 102 of any type may be configured to communicate with the cloud computing service 101. The cloud computing service 101 and the client devices 102 of the system 100 may be connected through a remote network, such as the Internet. The network connection may be facilitated through a local area network, wide area network, Ethernet, fiber optic network, wireless network, cellular network, interactive television network, telephone network, wireless data transmission system, two-way cable system, customized private or public computer network, interactive kiosk network, direct link, satellite network, and or any other wired or wireless connection.

Figure 2:
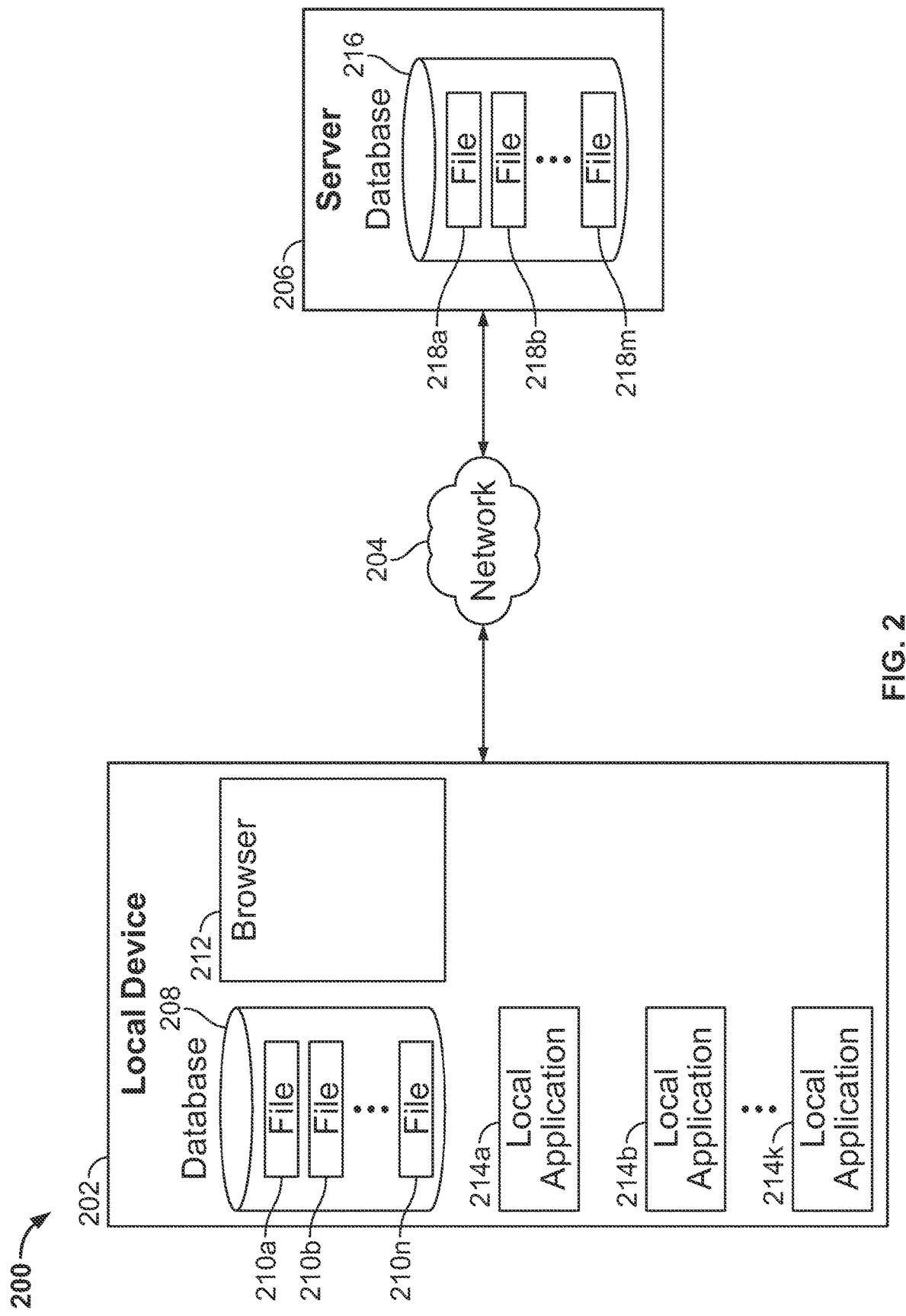
FIG. 2 is a block diagram of a local device in communication with a server via a network, according to an illustrative implementation.

FIG. 2 illustrates an exemplary system 200 of a local device 202 in communication with a server 206 via a network 204. The system 200 may be used to open cloud-based files with local applications over a browser. For clarity of illustration, only one local device 202 and one server 206 are depicted in FIG. 2, but in general any number of local devices 202 may communicate with any number of servers 206 over the network 204. The local device 202 may be equivalent to one of the client devices 102 shown and described in relation to FIG. 1, and the server 206 may be included in a cloud computing service such as the cloud computing service 101 shown in FIG. 1. As shown in FIG. 2, the server 206 includes a database 216 that stores cloud files 218a, 218b, . . . , 218m (generally, cloud files 218). Each cloud file 218 may be associated with a different document on the cloud computing service 101. For example, the cloud files 218a and 218b may each be associated with different word processing documents, while cloud file 218m may be associated with a spreadsheet document, such as the spreadsheet document 103 stored on the cloud computing service 101.

The local device 202 includes a database 208, a browser 212, and a set of local applications 214a, 214b, . . . , 214k (generally, local application 214). The database 208 stores local files 210a, 210b, . . . , 210n (generally, local files 210). The local files 210 may or may not be associated with documents on a cloud computing service 101. When the local files 210 are associated with documents that are stored on the cloud computing service 101, a local file's association with a cloud computing service 101 may include synchronization of the local file with a file stored on a server, such as one of the cloud files 218.

The local applications 214 may be software applications that perform one or more operations on files. Examples of operations that may be performed by any of the local applications 214 include opening, displaying, editing, receiving edits for, and saving. The browser 212 may be configured to communicate with the server 206 through one or more intermediary components or software applications that may or may not include the local applications 214. In particular, the browser 212 may display a user interface such that a user may interact with documents on the cloud computing service 101. In an example, the browser 212 receives a user input to request a document that is stored on the cloud computing service 101, and perform operations on the document. The requested document that is stored on the cloud computing service 102 may be synchronized with one of the local files 210 stored on the local device 202. In response to receiving the user input, the browser 212 communicates with one of the local applications 214 to request for the local application 214 to perform operations on the corresponding local file 210. In this manner, by providing file synchronization between the local device 202 and the remote server 206, the system 200 allows a user to, through a browser 212, request to perform operations on local files 210 with local applications 214.

Figure 3:
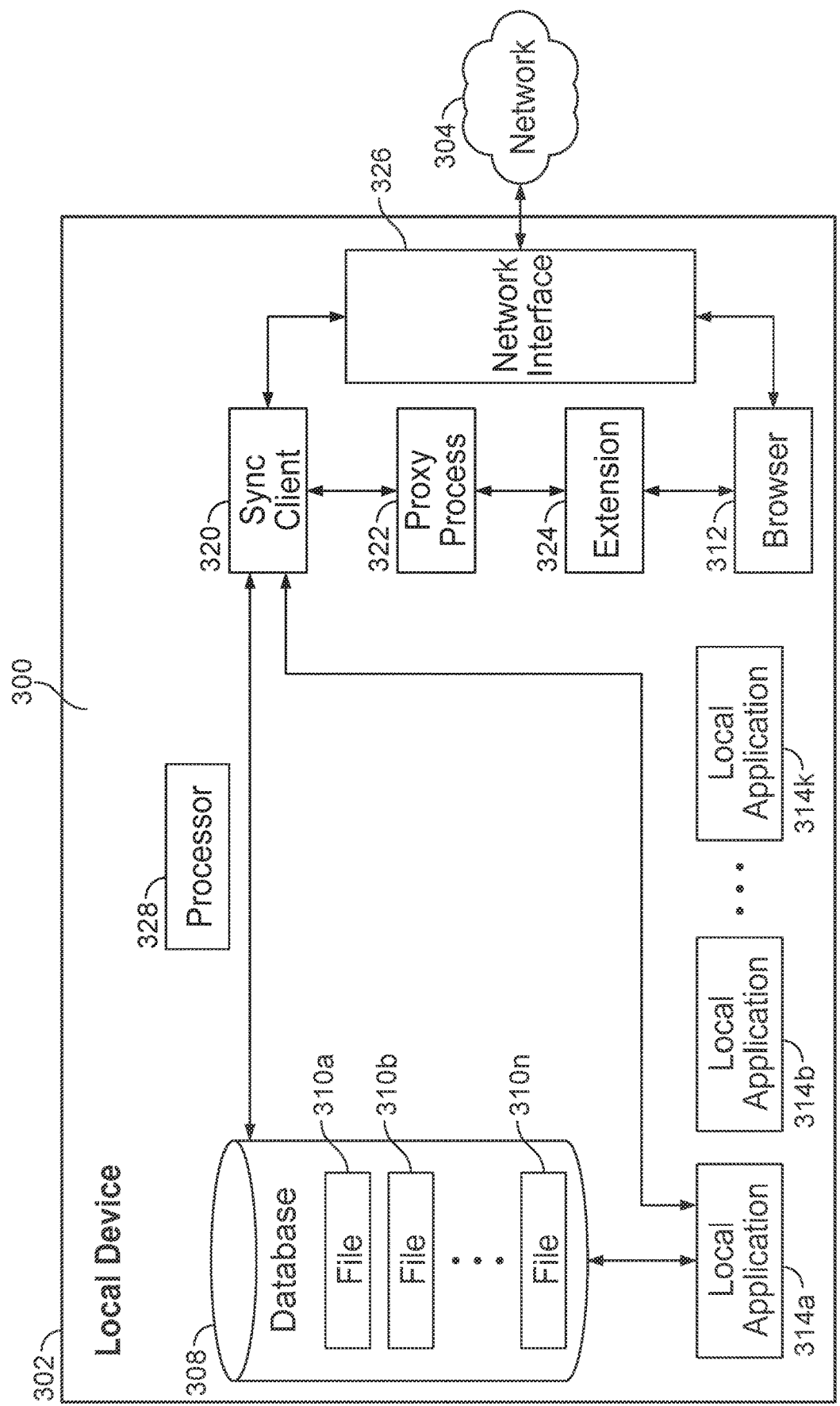
FIG. 3 is a block diagram of a local device in communication with a network, according to an illustrative implementation.

FIG. 3 depicts an exemplary system 300 including a local device 302 that communicates with a network 304. The local device 302 may be similar to the local device 202 shown and described in relation to FIG. 2, but FIG. 3 shows a more detailed view of the components within the local device 302. Specifically, the local device 302 includes a local database 308 having the local files 310, a browser 312, local applications 314, a sync client 320, a proxy process 322, a browser extension 324, a network interface 326, and a processor 328. The processor 328 runs applications, functions, methods, and processes on the local device 302, such as the applications 314, the sync client 320, the proxy process 322, the browser extension 324, and the browser 312. The network 304, the database 308, the local files 310, the browser 312, and the applications 314 may perform similar functions as the network 204, the database 208, the local files 210, the browser 212, and the applications 214, respectively. The network interface 326 acts as an intermediary in communication between the local device 302 and remote resources accessible via the network 304. In particular, the local applications 314 and/or the local files 310 on the local device 302 communicate with a server (such as the server 206) via the network 304.

As shown in FIG. 3, the browser 312 communicates with local applications 314 over the browser extension 324, the proxy process 322, and the sync client 320. As shown in FIG. 3, the local device 302 only includes one browser extension 324, one proxy process 322, and one sync client 320, but in general, any number of these components may be included in the local device 302 and may perform any of the functions described herein. In an example, the browser extension 324 performs actions in response to user requests received by the browser 312. Such user requests may include requests to perform operations on documents on a cloud service, such as the cloud computing service 101. The browser extension 324 may include JAVASCRIPT code, or code of a similar language, which may call objects, functions, methods, subroutines, processes, or operating system commands. The browser extension 324 may be installed automatically when the sync client 320 is installed on the local device 302, or when the browser extension 324 is installed. As used herein, "browser" refers to a software application which can retrieve and display information, a browser extension, or any suitable combination thereof. While the browser 312 and the browser extension 324 are shown as two separate elements in FIG. 3, one will understand that the browser 312 may include the browser extension 324, such that any of the functions described herein as being performed by the browser extension 324 may alternatively or additionally be performed by the browser 312. Similarly, any of the functions described herein as being performed by the browser 312 may instead be performed by the browser extension 324.

In some examples, communication between any of the browser 312, the browser extension 324, the sync client 320, and the local applications 314 includes inter-process communication (IPC). In this case, the proxy process 322 facilitates communication between the browser extension 324 and the sync client 320 by forwarding communications received from one (e.g., the browser extension 324 or the sync client 320) to the other (e.g., the sync client 320 or the browser extension 324). The proxy process 322 is a separate executable, and multiple instances of the proxy process 322 may be open or running at any given time. In some examples, a new instance of the proxy process 322 is started when JAVASCRIPT in the browser extension 324 calls an initiating function in response to receiving a user request to open a document with a local application. In some examples, an instance of the proxy process 322 may be destroyed or terminated by the browser 312, the browser extension 324, JAVASCRIPT in the browser extension 324, or by garbage collection. Herein, garbage collection refers to routine memory maintenance performed by operating systems, programs, processes, and applications. The proxy process 322 may sometimes modify a communication before forwarding the modified communication. In an example, the proxy process 322 modifies the communication by performing any one or more of the following: changing the format of the communication, adding data or elements to the communication, or removing data or elements from the communication. Communication with the proxy process 322 may include one or more of a standard input stream (stdin), a standard output stream (stdout), and a standard error stream (stderr). Stdin, stdout, and stderr streams are byte streams of data between an application and its environment. While by default, the stdin stream takes keyboard data, and the stdout stream is displayed on a monitor, any of the three streams can be redirected. In an example, the stdin stream of the browser extension 324 may be directed to the proxy process 322 such that the browser extension 324 receives input from the proxy process 322. The stdout and stderr streams of the browser extension 324 may be directed to the proxy process 322 such that the browser extension 324 outputs directly to the proxy process 322. Likewise, any of the stdin, stdout, and stderr streams of the sync client 320 may be directed to the proxy process 322. In some examples, stdin, stdout, and stderr communication is in the format of JAVASCRIPT OBJECT NOTATION (JSON) strings with length bytes or words prepended. In these examples, the browser extension may now pass serializable JAVASCRIPT objects to the proxy process 322 and may receive objects back in a similar format. In another example, communication with the proxy process 322 may include the use of one or more named pipes. In another example, communication with the proxy process 322 may include message passing. In an example, cryptographic authentication may be required prior to communication between the browser 312, the browser extension 324, and the sync client 320. In another example, communication between browser 312, browser extension 324, sync client 320, and local applications 314 may include other forms of communication between applications. To enable this communication, the browser extension 324 may be installed when a user signs into, or otherwise authenticates with, the sync client 320. By using the proxy process 322 to pass messages between the browser extension 324 and the sync client 320, the browser 312 may communicate with local applications 314 to operate on local files 310.

In some examples, a dummy domain on the network 304 is used for communication between the browser 312, the browser extension 324, and the sync client 320. In an example, the dummy domain may be registered to a domain name system that refers to a domain typically associated with a local device 302 such as localhost (127.0.0.1). In this case, the local device 302 may include a certificate that validates secure hypertext transfer protocol (HTTPS) requests. In this case, a proxy process 322 may not be used.

In some examples, a full-duplex communications protocol such as a WebSocket protocol is used for communication between the browser 312 and the sync client 320. In some examples, the browser extension 324 may not be used. The proxy process 322 may act as an intermediary proxy between the browser 312 and the sync client 320. The browser extension 324 may expose a JSON protocol endpoint via a messaging application programming interface (API). In this case, a web page displayed on the browser 312 may transmit messages to and receive messages from the proxy process 322, which relays such messages to and from the sync client 320. The browser 312 may connect to the proxy process 322, establish a port object, and send a notification to the proxy process 322. The browser 312 may create a WebSocket connection and associate the WebSocket connection with the port object. In this way, communication between the browser 312 and localhost (the local device 302's loopback network interface) is handled through the WebSocket connection. In this case, incoming messages to the port may be serialized and forwarded to the WebSocket. Incoming messages to the WebSocket may be converted into JSON strings and posted back to the web page. By using the proxy process 322 to transmit content between the web page displayed on the browser 312 and the insecure localhost Websocket connection, avoiding mixed content warnings that may otherwise occur if secure webpages (such as SSL signed pages) communicate with non-secured network addresses such as localhost. Such mixed content warnings would inhibit communication between the browser 312 and the localhost Websocket connection.

In some examples, the sync client 320 communicates with the local applications 314 and the database 308. In particular, the sync client 320 may be associated with the local files 310 in the database 308. This association may arise from the sync client 320 performing synchronization of the local files 310 in the database 308 with documents on the cloud computing service 101. In an example, synchronization of a local file 310a may involve transmitting and receiving changes to the local file 310a such that the local file 310a is a copy of a cloud file 218a that is stored on the server 206, or such that the cloud file 218A is a copy of local file 310a. As shown in FIG. 3, the sync client 320 transmits instructions to the local applications 314 to launch by transmitting a request to open, display, edit, or display a file.

In some examples, the applications 314 are registered with the sync client 320 using a manifest file, which may be dynamically generated and placed in a user profile when the sync client 320 and/or the browser 312 is initialized. In an example, the sync client 320 may only communicate with local applications 314 that are registered with the sync client 320 using the manifest file. By registering local applications via a manifest file, the sync client 320 may reduce the likelihood of security breaches caused by execution of potentially harmful applications.

Figure 4:
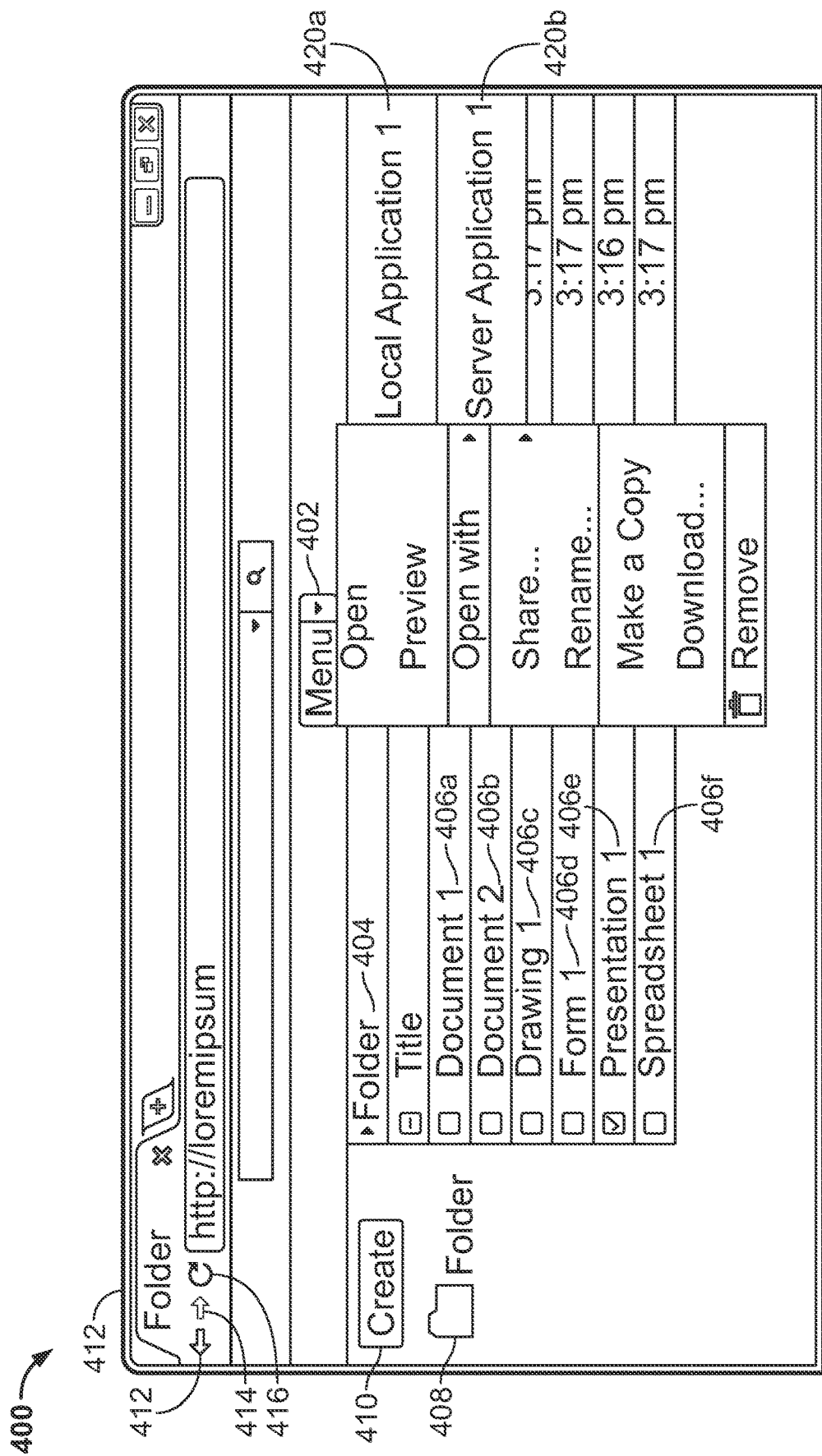
FIG. 4 depicts a user interface of a cloud computing service, according to an illustrative implementation.

FIG. 4 depicts an exemplary user interface 400 used to manage and access documents stored in a cloud computing service 101. The user interface 400 may be provided in a browser 212 on a local device 202 to a user. As shown in FIG. 4, the user interface 400 displays a webpage that includes content delivered from a server. To view the user interface 400, a user may be required to log in, or authenticate with an authentication server. By requiring authentication, the user interface 400 may display content customized to the logged-in user, such as a set of documents 406 stored on a cloud service (such as the cloud computing service 101) and associated with the user. In the example shown in FIG. 4, the documents 406a and 406b are word processing documents, the document 406c is a drawing document, the document 406d is a form document, the document 406e is a presentation document, and the document 406f is a spreadsheet document. This arrangement of documents is not limiting, and arrangements or types of documents other than those depicted in FIG. 4 may be displayed in user interface 400 without departing from the scope of the present disclosure. Documents stored on the cloud computing service 101 may be arranged or contained in folders, such as the folder 408. When the user selects the create button 410, a new document may be created. As shown in FIG. 4, the user interface 400 includes a display of folders on the cloud service that are associated with the user and a display of the contents of a folder.

Sometimes, the local device 202 is online and connected to the server 206. In this case, the server 206 may store copies of the displayed documents 406 in database 216. The set of displayed documents 406 may correspond to a set of documents that are associated with the user and for which the server 206 has copies in the database 216. The sync client 320 may, while the local device 202 is online, update the database 208 such that local copies of documents on the cloud computing service 101 are maintained on the local device 202, such that even when the local device 202 is offline, the documents are still accessible. The local device 202 may become offline and disconnected from the server 206, such as when the local device 202 is disconnected from the network 204. This may occur when the local device 202 is in a region of intermittent wireless network coverage or is unplugged from a wired network connection. The offline state may also occur when the local device 202 is connected to the network 204, but the local device 202 and/or one or more applications on the local device 202 are not authenticated, such that the server 206 prevents the local device 202 from accessing the server 206. When the local device 202 is offline, the user interface 400 may still be able to display documents 406. The documents 406 may correspond to local files 210 that are stored in the database 208 and are associated with the logged-in user.

The user may use the user interface 400 to select to open a document 406 with one of the local applications 214. In particular, the user may select one of the documents 406 and then select an application 214 with which to open the selected document 406. In the example depicted in FIG. 4, the user has selected presentation document 406e by selecting the adjacent checkbox. In general, other methods of selecting a document may be used, such as by clicking on the name of the desired document one or more times, or dragging and dropping the desired document into a specified location. As is shown in FIG. 4, the user then selects an application by selecting the menu 402 and then selecting the "open with" option 418.

When the user has selected the option 418, the user is then presented with a list of candidate applications 420a and 420b (generally, candidate application 420). The list of candidate applications 420 may be limited to only include applications that are configured to perform operations on documents having the same file type as the selected file 406e. The candidate applications 420 shown in FIG. 4 only include one local application 420A and one server application 420B, but in general, any numbers of local applications and/or server applications may be shown. Sometimes, no local applications (or server applications) may be configured to operate on the selected file, such that no local applications (or server applications) are included the list. The user may select one of the listed applications 420 to operate on the selected document 406e.

As described in relation to FIG. 4, the user first selects the file 406, and then the application 406 to use to open the selected file. In another example, the user may first select an application from a list of applications, and then select a document on which the selected application is configured to operate. In another example, the user may not provide a selection of an application, and a default application may be used to open the selected file. When the local device 202 is online, a copy of the selected document may be provided from one of the cloud files 218 on the server database 216. Alternatively, a copy of the selected document may be provided from one of the files 214 on the local database 208. When the local device 202 is offline, a copy of the selected document may be provided from one of the local files 210 on the local database 208. Accordingly, with the browser-based user interface 400, the user may access and edit a cloud-based document using a local application. Accessing and editing a cloud-based document with a local application allows the user to take advantage of increased functionality of the local application, as compared to a cloud-based application. Using local applications may also provide an improved editing experience, since using a cloud-based application may result in noticeable latency if a network connection is slow or intermittent.

Figure 5:
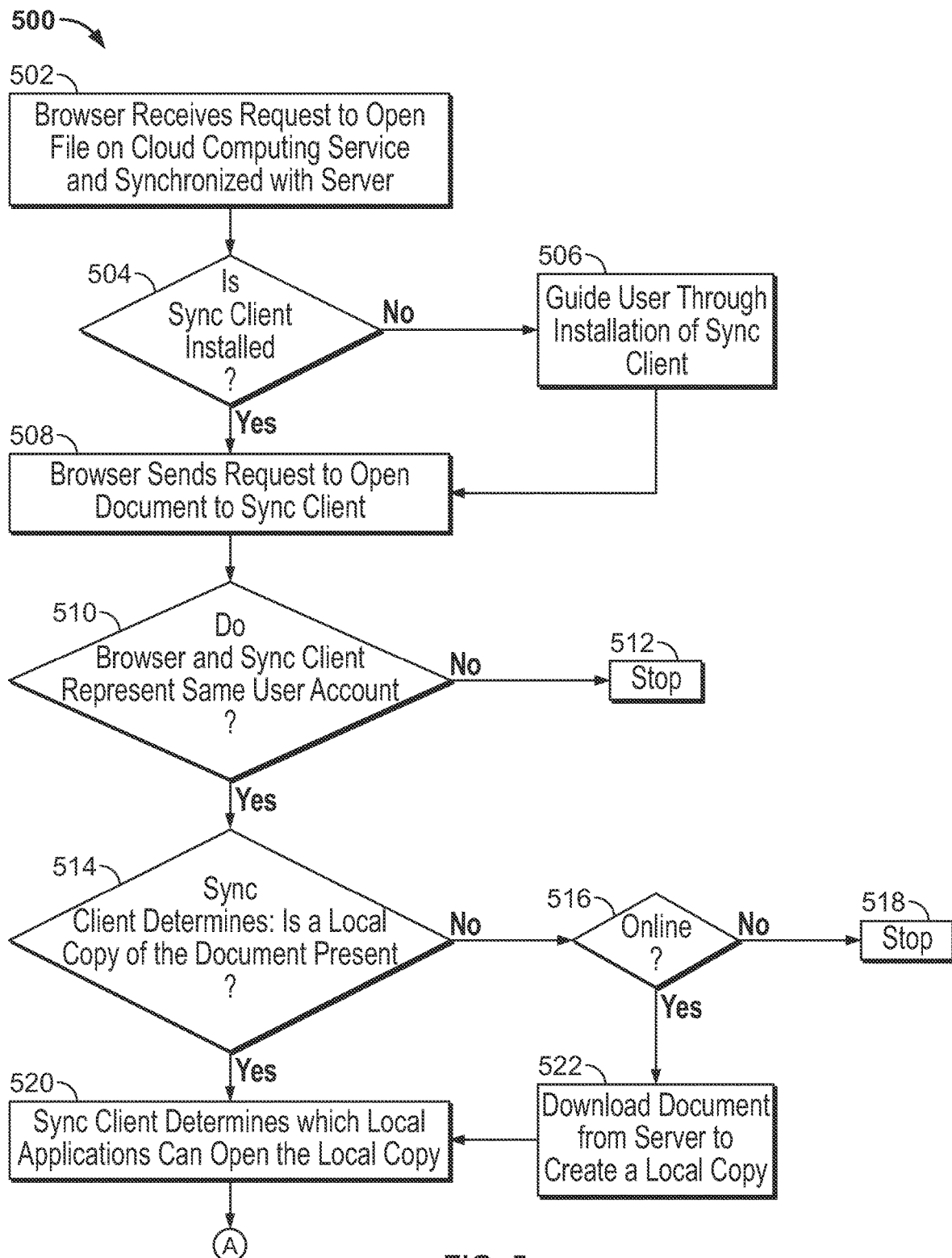
FIG. 5 is a flow chart of a method performed by a browser to communicate with a local application to open a local file, according to an illustrative implementation.
Figure 5:
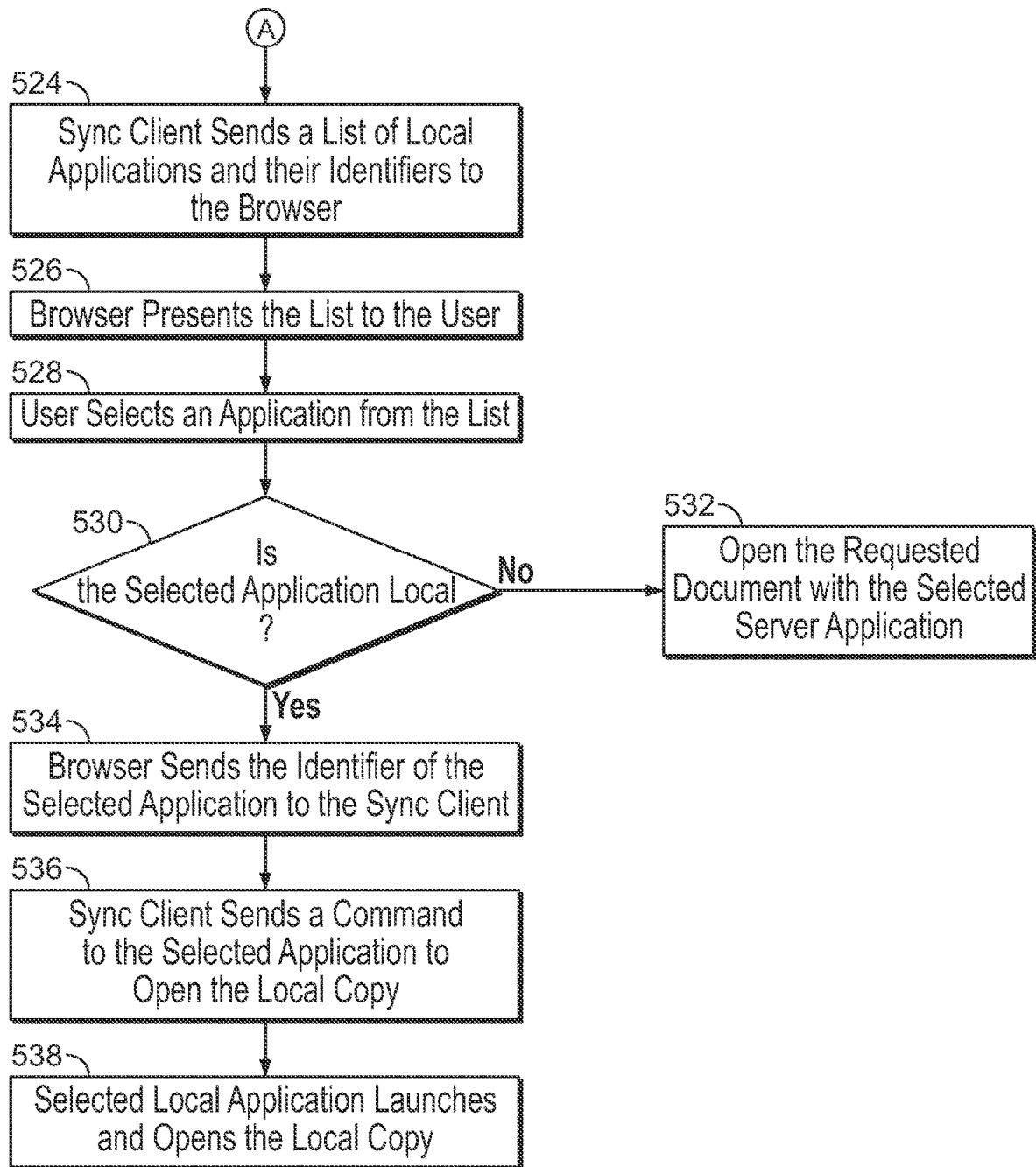

FIG. 5 is a flow chart of an exemplary method 500 of opening a document using a local application based on a request from a user. At step 502, the browser 212 receives a request from a user to open a document that is stored on a cloud service, such as the cloud computing service 101. Examples of requested documents may include any of the document 103 and documents 406. The requested document may be associated with a file stored on a server, such as the server 206, and examples of the associated files may include the cloud files 218. In an example, the request is received by the user interface 400 as described in relation to FIG. 4.

At decision block 504, a processor running the browser extension 324, such as the processor 328, determines whether the sync client 320 is running on the local device 302. In some examples, the processor 328 determines whether the sync client is installed on the local device 302. In some examples, the processor consults a registry, a property list, a plist, a database, preferences, configuration files, or file locations to determine whether the sync client 320 is installed. If the sync client 320 is not installed, the method 500 proceeds to step 506 to guide the user through the installation of the sync client 320. Otherwise, if the sync client 320 is installed, the method 500 skips the step 506 and proceeds directly to the step 508. In some examples, if the sync client 320 is not installed, the method 500 does not guide the user through the installation of the sync client 320 at step 506, but instead the method 500 terminates.

At step 508, the browser extension 324 sends a request to open the requested document to the sync client 320. This request may be transmitted to the sync client 320 via one or more of a proxy process 322, a WebSocket protocol, a named pipe, standard input, standard output, standard error, a message passing protocol, cryptographic authentication, and other means of communication between applications. All communication between applications described herein, such as between any of browser 312, browser extension 324, proxy process 322, sync client 320, network interface 326, local applications 314, database 308, other applications on local device 302, and similar components on local device 202 and server 206, may use any of the means of communication between applications described herein. The request to open the requested document may include an identifier of the requested document and an identifier of the user logged into the cloud computing service 101.

At decision block 510, the browser extension 324 and the sync client 320 authenticate with each other to determine whether the user logged into the cloud computing service 101, via the browser 312, is the same as a user who is authorized to access the local files 310 via with the sync client 320. This determination may include determining whether the user who is logged into the cloud computing service 101 and the authorized user of the sync client 320 represent the same user account. In some examples, the browser 312 and the sync client 320 perform authentication by verifying that the domain of the user account is a recognized domain, such as google.com. In some examples, communication between the browser extension 324 and the sync client 320 to perform authentication occurs via a proxy process 322. In other examples, a proxy process is not involved in this communication. This authentication may be performed using a pre-shared key, communication with an authentication server, or another method to determine that the same user is logged in to both the browser 312 and the sync client 320. The authentication process illustrated in FIG. 6 may be used to perform the above authentication. In some examples, step 510 may occur after step 514 or step 520.

If the browser 312 and the sync client 320 do not represent the same user account, the method 500 proceeds to step 512 to terminate. In some examples, upon termination, a message may be presented to the user via the user interface 400. The message may include the reason for termination and may suggest one or more actions that the user may take to properly authenticate. Suggested actions may include logging into the sync client 320 and logging into the cloud computing service 101 such that the same user account is authenticated with both the sync client 320 and the cloud computing service 101.

At decision block 514, the processor 328 running the sync client 320 determines whether a local copy of the requested document is available on the local device 302. The processor 328 may make this determination by determining that a file in the database 308, such as one of local files 310, is associated with the requested document on the cloud computing service 101. The processor may use the document identifier included in the communicated request received by the sync client 320 at step 508 to determine if a local copy is available. Such an available local copy may be synchronized with one of the cloud files 218 on the server 206. Alternatively, the available local copy may have previously been synchronized with one of the cloud files 218 on the server 206 at a previous time, regardless of whether the local device 302 is online and regardless of a length of time that has passed since the local copy was synchronized with one of the cloud files 218 on the server 206. In some examples, if the length of time that has passed since the local copy was synchronized with the server 206 exceeds a predetermined threshold time, the user may be presented with a notification that the user will be working with a local copy that may not be the most current version of the requested document. If the length of time exceeds the predetermined threshold, the method 500 may proceed to decision block 516 and step 522 to attempt to download the latest copy from the server 206. In some examples, the method 500 may proceed to step 520 even if the length of time exceeds the predetermined threshold.

If, at decision block 514, the processor 328 running the sync client 320 determines that a local copy of the requested document is not available on the local device 302, the method 500 proceeds to decision block 516, at which the processor 328 determines whether the local device 302 is online. The processor 328 may make this determination by pinging a server, such as server 206, or otherwise communicating with a device at a remote location. If the local device 302 is not online and thus disconnected from the server 206, the method proceeds to step 518 to terminate. Upon termination, a message may be presented to the user via the user interface 400. The message may include a notification that a local copy is not available on the local device 302 and that the local device 302 is offline, preventing a local copy from being obtained from the server 206. In some examples, if the sync client 320 determines at decision block 514 that a local copy of the requested document is not available on the local device 302, the method 500 proceeds directly to a modified step 524, in which the sync client 320 sends an empty list of local applications to the browser.

If, at decision block 516, the sync client 320 determines that the local device 302 is online and thus connected to the server 206, the method 500 proceeds to step 522, at which the sync client 320 downloads a local copy of the requested document from the server 206 to the local device 302. In an example, the local copy may be one of the local files 310 in the database 308. In another example, the local copy may be stored in a less permanent location or in a volatile memory such as a random access memory (RAM). The user may be notified and prompted to allow the method 500 to continue, prior to the method proceeding to step 522. A local copy may have been originally unavailable due to a previous selection made by the user not to synchronize the requested document with the local device 302. Alternatively, a local copy may have been originally unavailable if the sync client 320 was not installed at step 502 but only installed at step 506 of the method 500. After the local copy of the document is downloaded from the server at step 522, the method 500 proceeds to step 520. Otherwise, at decision block 514, the sync client 320 determines that a local copy of the requested document is available, the method 500 proceeds to step 520.

At step 520, the sync client 320 determines which, if any, of the local applications 314 are capable of performing operations on the local copy. The sync client 320 may determine that none, one, or a plurality of local applications 314 is configured to perform operations on the local copy. The sync client may make this determination by determining the file type of the local copy by analyzing the document identifier, the file name, the file extension, the header, or other means of determining the format, and then comparing to one or more of a manifest file, a registry, a property list, a plist, configuration files, preferences, a database, or other means of determining local applications that are configured to perform operations on a particular file type or format. The sync client 320 may determine that one of local applications 314 is a default application for opening the local copy.

At step 524, the sync client 320 sends a list of local applications capable of operating on the local copy to the browser extension 324, optionally via the proxy process 322. The list may reference none, one, or a set of the local applications 314 that are configured to operate on the local copy by using identifiers of the applications. The list may include, for each application referenced by the list, whether the application is the default application for files of the requested file type, and an icon for the application.

At step 526, the browser extension 324 presents the list of local applications to the user via user interface 400. In some examples, the browser extension 324 may also determine that one or more server applications can open the requested document. In these examples, the browser extension 324 may present a list of server applications to the user via the user interface 400. If the received list contains no local applications, no local applications may be presented to the user, and only server applications may be presented. If no server applications are configured to perform operations on the requested document, only local applications may be presented. If no local applications and no server applications are configured to perform operations on the requested document or the local copy, then no applications may be presented, and the method 500 terminates. The user may be presented with a notification that the requested document cannot be opened.

At step 528, the user selects an application from the list. The user may make the selection via the user interface 400, as is explained in relation to FIG. 4. The user may be presented with an option to use a default application, instead of requiring the user to select an application from the list. Default applications may be beneficial, especially for users that often use the same application to open files of similar types. The default application for a specific file or file type may be updated based on a user's previous selection of applications for that file or file type.

At decision block 530, the browser extension 324 determines whether the selected application is a local application or a server application. For example, the browser extension 324 may compare the selected application to the list of applications sent at step 524 to determine whether the selected application is a local application or a server application. If the selected application is a server application, the method 500 proceeds to step 532 to open the requested document using the selected server application. In an example, the selected server application may open the requested document from a server 206 included in the cloud computing service 101, rather than opening a local copy of the requested document. In another example, the selected server application may open a local copy of the requested document from one of the local files 310.

Otherwise, if the browser extension 324 determines that the selected application is a local application at decision block 530, the method 500 proceeds to step 534, at which the browser extension 324 sends an identifier associated with the selected application to the sync client 320, optionally via the proxy process 322. The browser extension 324 may also send an identifier of the user that is logged into the cloud computing service 101, such as an email address, and an identifier for the requested document. A manifest file may store associations between applications and identifiers for use in step 534. In an example, an identifier corresponding to the selected application may be sent, rather than a local path, an executable, or other form of a direct command. In this example, security of the local device 302 is enhanced, since a local path, an executable, or a direct command may be used to attack the local device for malicious purposes. When an identifier associated with the selected application is used, the sync client 320 must also have the association, and the application must be known to the sync client 320 for the sync client 320 to perform an action based on the identifier. This provides an added layer of security to the local device 302. In other examples, an identifier of the application is not used, and a more direct but less secure method of identification is used, such as a local path, an executable, or another form of a direct command.

At step 536, the sync client 320 sends a command to the operating system of the local device to use the selected local application to open the local copy of the requested document. At step 536, the operating system may open the selected local application if necessary. The selected local application may be one of the applications 314, and the local copy may be one of local files 310. In some examples, the sync client 320 may send the command to the selected local application directly, or the proxy process 322 may participate in the sending of the command. In some examples, step 536 includes the step of prompting the user to confirm that the sync client 320 is allowed to open the selected application. In some examples, this prompting is performed for the first time that the sync client 320 opens each local application, and is not performed for subsequent times that the sync client 320 opens that application.

At step 538, the selected local application opens the local copy of the requested document. If the selected local application is not already running, the selected local application will launch prior to opening the selected local copy. The user may then view, edit, and save the local copy of the document using the selected local application. Any changes made to the document by the user may be transmitted to the server 206 by the sync client 320. By enabling communication between the browser 312, browser extension 324, sync client 320, and local applications 314, the system 300 enables one of local applications 314 to open one of the local files 310 based on a request received via the user interface 400.

In some examples, the method 500 is simplified. The browser 312 may determine the file type of the file at step 502 and include the file type in the request sent at step 508. In these examples, step 520 may comprise determining which local applications can open files of the requested file type, regardless of whether a local copy is present. In these examples, once an application is selected in step 528, the sync client 320 may download the requested document from a server to create a local copy 310a.

Figure 6:
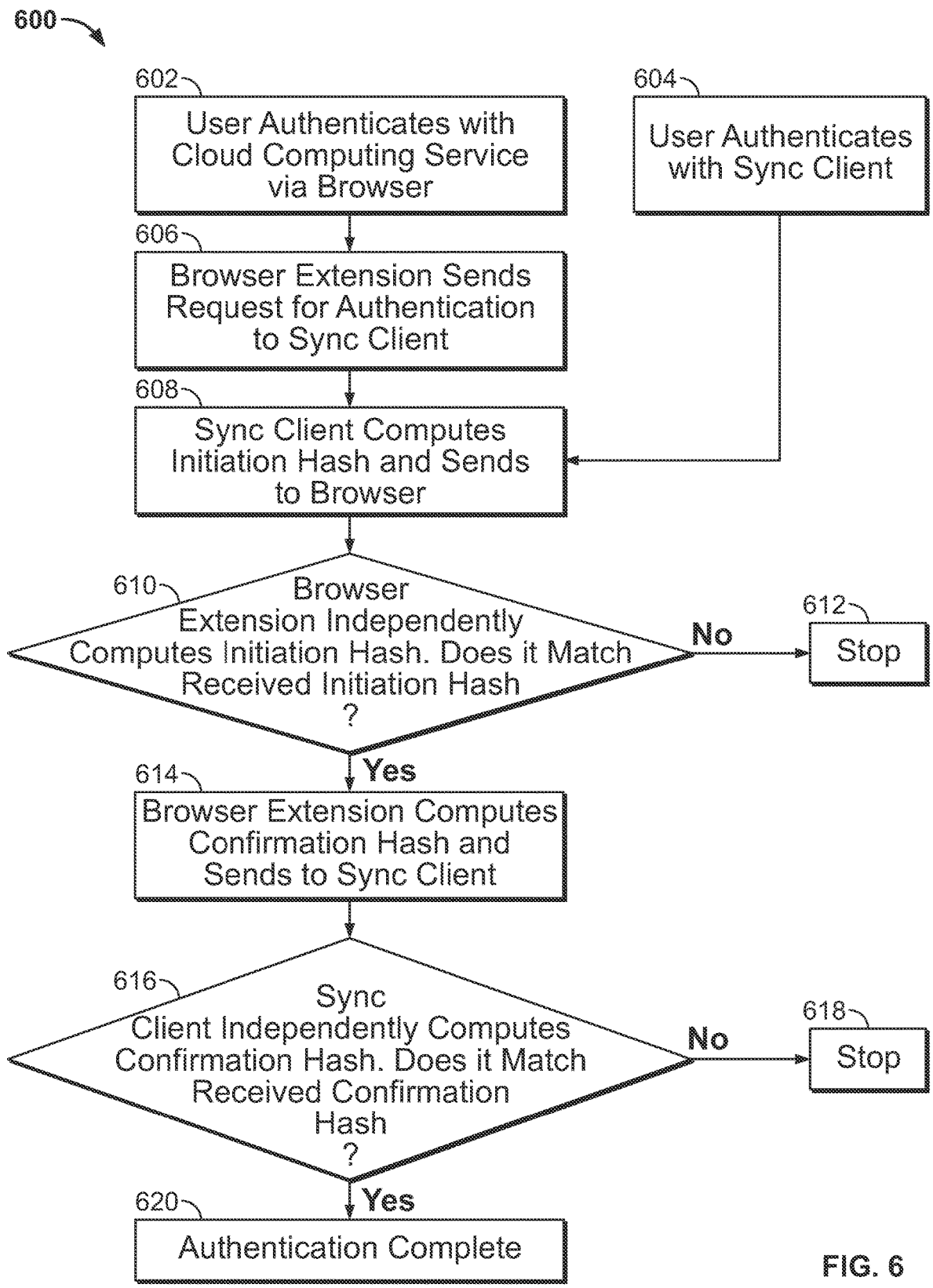
FIG. 6 is a flow chart of a method performed by a browser and a sync client to determine that they both represent the same user account, according to an illustrative implementation.

FIG. 6 is a flow chart of an exemplary method 600 used by the system 200 to authenticate the user, such as at decision block 510 as is described in relation to FIG. 5. The browser extension 324 and the sync client 320 may use the method 600 to determine that they represent the same user, and thus that the user logged into the browser has access to the local files 310.

At step 602, the user authenticates with the cloud computing service 101 using the browser 312. During the authentication, the browser 312 may receive a pre-shared key from a server associated with the cloud computing service 101, and may also share the pre-shared key with the browser extension 324.

At step 604, the user authenticates with the sync client 320. Authentication with the sync client 320 may be a part of the sync client 320 installation, or may be unrelated to installation of the sync client 320. For example, the authentication may occur upon startup of local device 302, an authentication in response to the user request for a document in step 502 of method 500, an authentication when the local device transitions from offline to online, or an authentication at another time.

At step 606, the browser extension 324 sends a request for authentication to the sync client 320, optionally via the proxy process 322. During the authentication, it is determined that the same user account is represented by both the browser extension 324 and the sync client 320. The request for authentication may be transmitted via any of the methods or protocols described herein relating to communication between applications. In some examples, the transmission of a request for authentication includes the sending of a nonce from the browser extension 324 to the sync client 320.

At step 608, the sync client 320 computes an initiation hash and sends the initiation hash to the browser extension 324. In an example, computing an initiation hash involves the sync client 320 establishing a separate nonce and computing a hash of: a nonce received from the browser extension 324 (such as the nonce that may be received at step 606); a separate nonce established by the sync client 320 (such as the separate nonce that may be established at step 608); an "establish" keyword; a pre-shared key representing the user account that is logged into the sync client 320; or any suitable combination thereof. In an example, the sync client 320 sends the initiation hash computed by the sync client 320 and the nonce established by the sync client 320 to the browser extension 324.

At decision block 610, the browser extension 324 independently computes an initiation hash and determines whether the initiation hash computed by the browser extension 324 matches the initiation hash received from the sync client 320. Independent computation of the initiation hash may include the browser extension 324 computing a hash of: a nonce established by the browser extension 324 (such as the nonce that may be established at step 606); a nonce received from the sync client 320 (such as the nonce that may be received at step 608); an "establish" keyword; a pre-shared key representing the user account that is logged into the cloud computing service 101; or any suitable combination thereof. After independent computation of the initiation hash, the browser extension 324 determines whether the independently computed initiation hash matches the initiation hash received from the sync client 320. If the computed initiation hash does not match the received initiation hash, this may reflect that the same user account is not logged into both the sync client 320 and the cloud computing service 101. If, at decision block 610, the browser extension 324 determines that these two initiation hashes do not match, the method proceeds to step 612 to terminate. Upon termination of the method, the user may be presented with a notification that authentication has failed and may be advised of one or more actions to take to properly authenticate.

At decision block 610, the browser extension 324 determines whether the same user is logged into both the browser extension 324 and the sync client 320. To enhance security of the locally stored files 310, the sync client may independently make the same determination. If at decision block 610, the received initiation hash matches the independently computed initiation hash, the method 600 proceeds to step 614, at which the browser extension 324 computes a confirmation hash and sends the confirmation hash to the sync client 320. Computation of the confirmation hash may involve computing a hash of: a nonce established by the browser extension 324 (such as the nonce that may be sent in step 606); a nonce received from the sync client 320 (such as the nonce that may be received in step 610); a "confirm" keyword; a pre-shared key representing the user account that is logged into the cloud computing service 101; or any suitable combination thereof.

At decision block 616, the sync client 320 independently computes a confirmation hash and determines whether the confirmation hash computed by the sync client 320 matches the confirmation hash received from the browser extension 324. Independent computation of the confirmation hash by the sync client 320 may involve the sync client 320 computing a hash of: a nonce received from the browser extension 324 (such as the nonce that may be received in step 606); a nonce established by the sync client 320 (such as the nonce that may be established in step 608); a "confirm" keyword; a pre-shared key representing the user account that is logged into the sync client 320, or any suitable combination thereof. After independent computation of the confirmation hash by the sync client 320, the sync client determines whether the confirmation hash computed by the sync client 320 matches the confirmation hash received from the browser extension 324. If the independently computed confirmation hash does not match the received confirmation hash, this may be an indication that the same user account is not logged into both the sync client 320 and the cloud computing service 101. If this is the case, the method 600 proceeds to step 618 to terminate. Upon termination of the method, the user may be presented with a notification that authentication has failed and may be advised of one or more actions to take to properly authenticate.

Otherwise, if the sync client 320 determines that the confirmation hash received from the browser extension 324 does match the confirmation hash independently computed by the sync client 320 at decision block 616, the method 600 proceeds to step 620 to complete authentication. By performing this authentication, the sync client 320 and the browser extension 324 both independently verify that they represent the same user account, thereby ensuring that only authorized users can access locally stored files. It is advantageous for both the browser extension 324 and the sync client 320 to independently perform this verification, to improve detection of whether the browser extension 324 or the sync client 320 have been compromised. However, independent verification by both the browser extension 324 and the sync client 324 may be time consuming and unnecessarily inefficient. Thus, only one of these components may perform the verification and transmit a message to the other component indicating that authentication is complete, eliminating the need for the other component to perform a separate verification.

Figure 7:
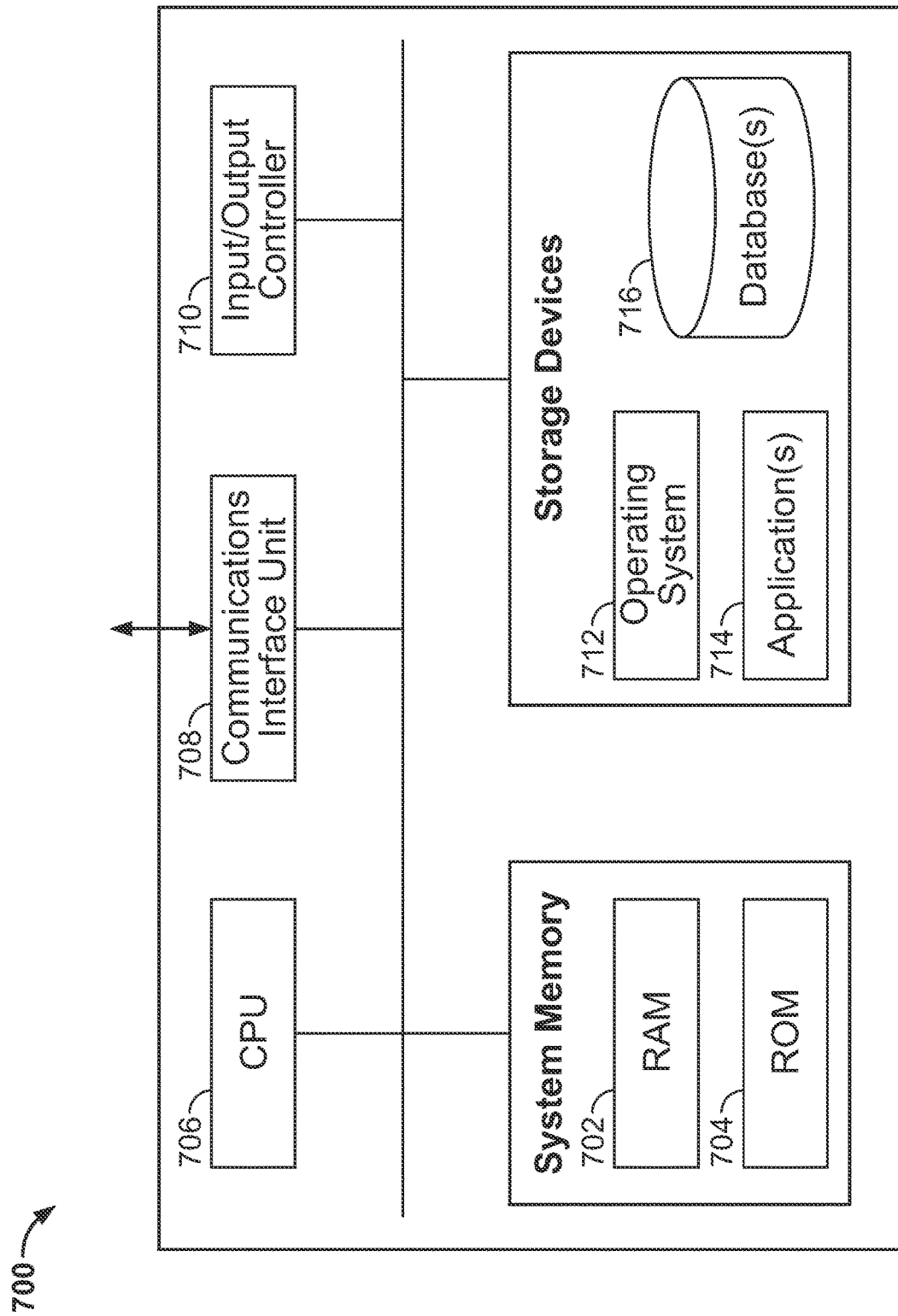
FIG. 7 is a block diagram of a computing device for performing any of the processes described herein, according to an illustrative implementation.

FIG. 7 is a block diagram of a computing device, such as any of the components of the systems of FIGS. 1-3, for performing any of the processes described herein. Each of the components of these systems may be implemented on one or more computing devices 700. In certain aspects, a plurality of the components of these systems may be included within one computing device 700. In certain implementations, a component and a storage device may be implemented across several computing devices 700.

The computing device 700 includes at least one communications interface unit, an input/output controller 710, system memory, and one or more data storage devices. The system memory includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. Alternatively, a computer system may be virtualized to provide the functions of multiple computing devices 700. In FIG. 7, the computing device 700 is linked, via network or local network, to other servers or systems.

The computing device 700 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 706 includes a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals.

The CPU 706 is also in communication with the data storage device. The data storage device may include an appropriate combination of magnetic, optical or semiconductor memory, and may include, for example, RAM 702, ROM 704, flash drive, an optical disc such as a compact disc or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 706 may be connected to the data storage device via the communications interface unit 708. The CPU 706 may be configured to perform one or more particular processing functions.

The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program.

The operating system 712 and applications 714 may be stored, for example, in a compressed, an uncompiled and an encrypted format, and may include computer program code.

The instructions of the program may be read into a main memory of the processor from a computer-readable medium other than the data storage device, such as from the ROM 704 or from the RAM 702. While execution of sequences of instructions in the program causes the CPU 706 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 712, a database management system and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

What is claimed is:

1. A computer-implemented method, comprising:
    receiving, by a first application hosted by a local device, a request to open a document specified by a user via a user interface associated with the first application, the document having a document identifier and associated with a first file stored on a server, the request comprising the document identifier and a user identifier;
    communicating, by the first application, the request to open the document associated with the first file to a second application hosted by the local device, wherein the first application is a browser application hosted by the local device and the second application is a local application different from the browser application, and wherein the second application has access to local information about a plurality of document processing applications installed on the local device;
    receiving, by the first application from the second application, a list comprising one or more of the plurality of document processing applications that are on the local device and are capable of opening a second file that corresponds to the requested document associated with the first file stored on the server, wherein the second file is stored on the local device and has the same document identifier as the requested document, the second file being a local copy of the first file stored on the server;
    selecting, by the first application, one of the document processing applications from the list; and
    causing, by the first application, a selected processing application to open the second file that corresponds to the requested document associated with the first file stored on the server.

2. The method of claim 1, wherein the list is created based on a contents file that stores a list of local application identifiers corresponding to the plurality of document processing applications that are installed on the local device.

3. The method of claim 1, wherein the selected processing application opens the second file based on a received message that comprises an application identifier associated with the second application.

4. The method of claim 1, further comprising generating a hash based on at least one pre-shared key to determine the user is authorized to access the second file.

5. The method of claim 4, wherein the hash is computed based at least in part on at least one nonce.

6. The method of claim 1, wherein the request and the list include standard input or output streams of data associated with the first application.

7. The method of claim 1, wherein the browser application represents a browser extension.

8. A system comprising:
    a memory; and
    a processing device, coupled to the memory, to:
    receive, via a first application hosted by a local device, a request to open a document specified by a user via a user interface associated with the first application, the document having a document identifier and associated with a first file stored on a server, the request comprising the document identifier and a user identifier;
    communicate, via the first application, the request to open the document associated with the first file to a second application hosted by the local device, wherein the first application is a browser application hosted by the local device and the second application is a local application different from the browser application, and wherein the second application has access to local information about a plurality of document processing applications installed on the local device;
    receive, via the first application from the second application, a list comprising one or more of the plurality of document processing applications that are on the local device and are capable of opening a second file that corresponds to the requested document associated with the first file stored on the server, wherein the second file is stored on the local device and has the same document identifier as the requested document, the second file being a local copy of the first file stored on the server;

select, via the first application, one of the document processing applications from the list; and cause a selected processing application to open the second file that corresponds to the requested document associated with the first file stored on the server.

9. The system of claim 8, wherein the list is created based on a contents file that stores a list of local application identifiers corresponding to the plurality of document processing applications that are installed on the local device.

10. The system of claim 8, wherein the selected processing application opens the second file based on a received message that comprises an application identifier associated with the second application.

11. The system of claim 8, wherein the processing device is further to generate a hash based on at least one pre-shared key to determine the user is authorized to access the second file.

12. The system of claim 11, wherein the hash is computed based at least in part on at least one nonce.

13. The system of claim 8, wherein the request and the list include standard input or output streams of data associated with the first application.

14. The system of claim 8, wherein the browser application represents a browser extension.

15. A non-transitory computer readable medium having instructions stored thereon that, when executed by a processor, cause the processor to perform operations comprising:

receiving, by a first application hosted by a local device, a request to open a document specified by a user via a user interface associated with the first application, the document having a document identifier and associated with a first file stored on a server, the request comprising the document identifier and a user identifier;

communicating, by the first application, the request to open the document associated with the first file to a second application hosted by the local device, wherein the first application is a browser application hosted by the local device and the second application is a local application different from the browser application, and wherein the second application has access to local information about a plurality of document processing applications installed on the local device;

receiving, by the first application from the second application, a list comprising one or more of the plurality of document processing applications that are on the local device and are capable of opening a second file that corresponds to the requested document associated with the first file stored on the server, wherein the second file is stored on the local device and has the same document identifier as the requested document, the second file being a local copy of the first file stored on the server;

selecting, by the first application, one of the document processing applications from the list; and causing, by the first application, a selected processing application to open the second file that corresponds to the requested document associated with the first file stored on the server.

16. The non-transitory computer readable medium of claim 15, wherein the list is created based on a contents file that stores a list of local application identifiers corresponding to the plurality of document processing applications that are installed on the local device.

17. The non-transitory computer readable medium of claim 15, wherein the selected processing application opens the second file based on a received message that comprises an application identifier associated with the second application.

18. The non-transitory computer readable medium of claim 15, wherein the operations further comprise generating a hash based on at least one pre-shared key to determine the user is authorized to access the second file.

19. The non-transitory computer readable medium of claim 18, wherein the hash is computed based at least in part on at least one nonce.

20. The non-transitory computer readable medium of claim 18, wherein the first application is a browser or a browser extension associated with the browser.

* * * * *